Figure 1:
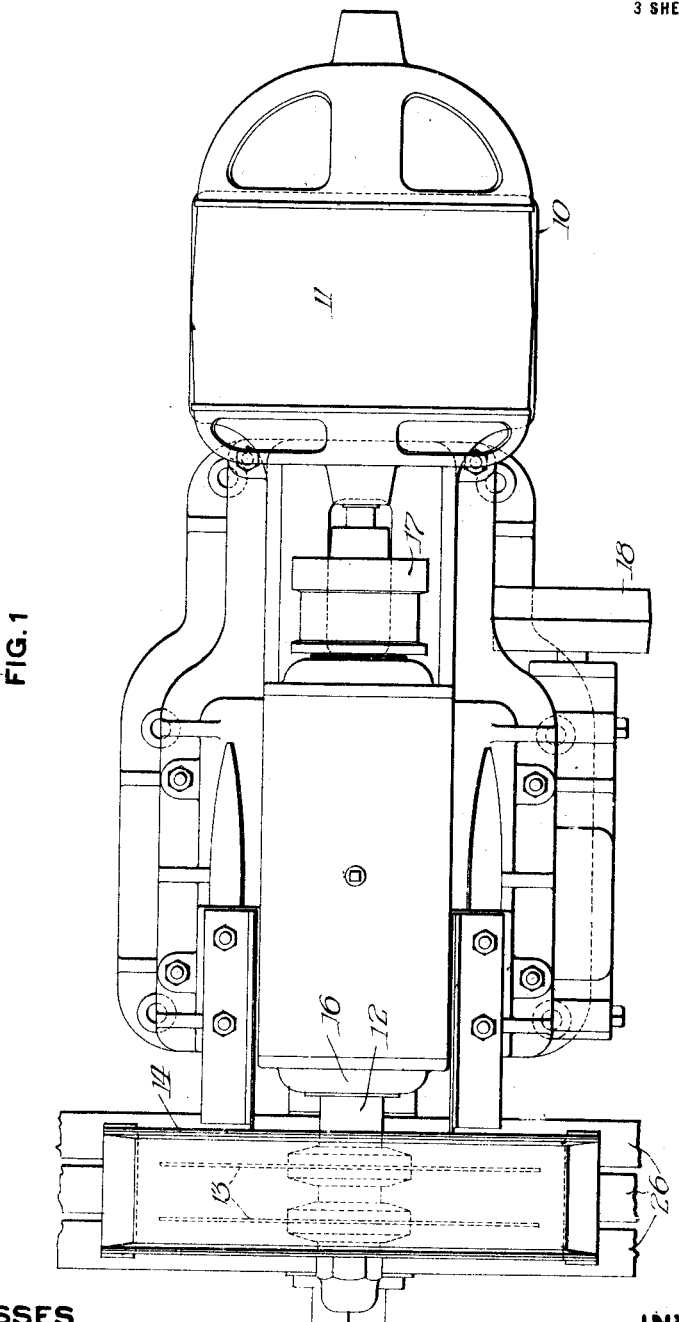

R. SCHOLZ.
APPARATUS FOR DIVIDING COUPLINGS.
APPLICATION FILED MAR. 29, 1915.

1,195,509.

Patented Aug. 22, 1916.
3 SHEETS—SHEET 1.

WITNESSES
Chas. Josterman
R D Letter

INVENTOR
Richard Scholz
By C Chenthicum
his Atty

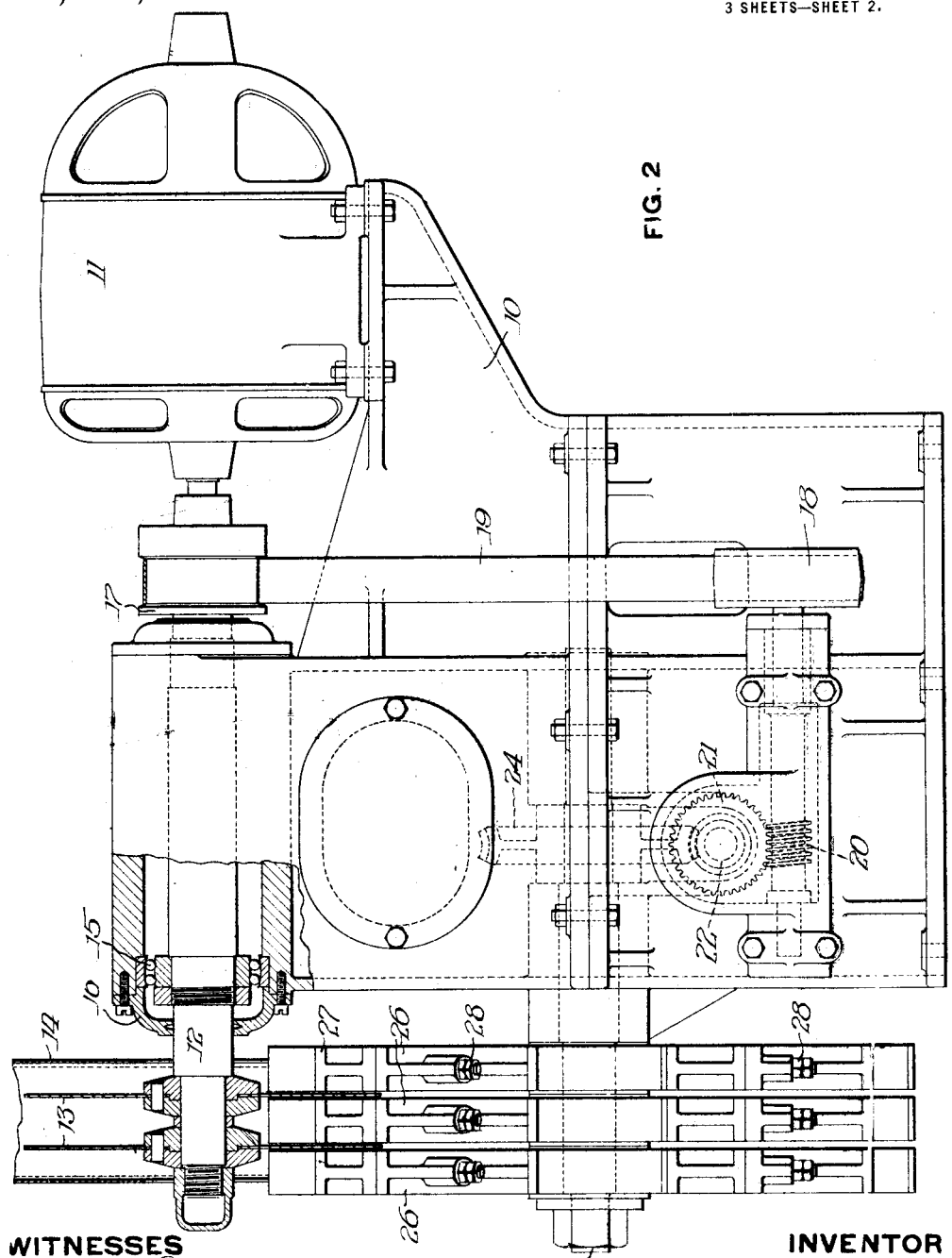

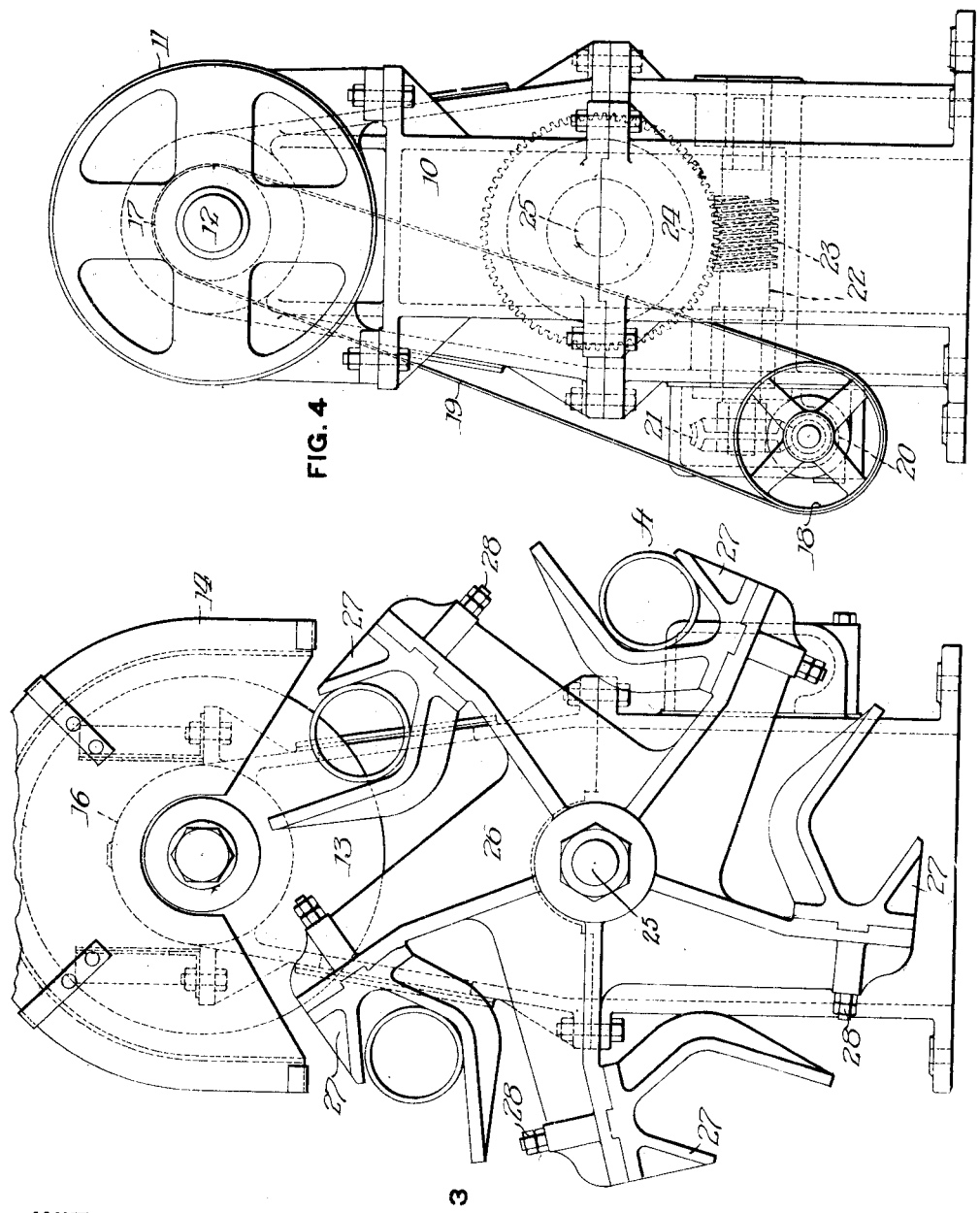

UNITED STATES PATENT OFFICE.

RICHARD SCHOLZ, OF LORAIN, OHIO, ASSIGNOR TO NATIONAL TUBE COMPANY, OF PITTSBURGH, PENNSYLVANIA, A CORPORATION OF NEW JERSEY.

APPARATUS FOR DIVIDING COUPLINGS.

1,195,509.

Specification of Letters Patent.

Patented Aug. 22, 1916.

Application filed March 29, 1915. Serial No. 17,765.

*To all whom it may concern:*

Be it known that I, RICHARD SCHOLZ, a citizen of the United States, and resident of Lorain, in the county of Lorain and State of Ohio, have invented certain new and useful Improvements in Apparatus for Dividing Couplings, of which the following is a specification.

My invention relates to the manufacture of wrought metal pipe couplings and more particularly relates to dividing or severing the welded couplings into single couplings.

The smaller sizes of wrought metal pipe couplings are made by welding the edges of a multiple length blank into an annulus and then severing the so formed blank into two, three, or more couplings in readiness for tapping the single couplings.

Heretofore it has been the practice to place the welded multiple length coupling upon a rotating support formed of two idler rollers and to lift the rollers with the coupling blank thereon so as to bring the coupling into engagement with a saw or other cutter. This forms a slow and expensive operation and requires the constant attention of the operator.

An object in the present construction is to provide for a semi-automatic machine by means of which the couplings may be severed without attention from an operator, it being only necessary to feed the uncut devices into the machine at intervals. The operator may, therefore, utilize a portion of his time in connection with welding or finishing operations.

The invention here described is compact, requires but small space and does not necessitate air, or other fluid pressure, for its operation as has been common heretofore. This in itself eliminates a considerable item of expense.

The invention will be more readily understood by reference to the accompanying drawings wherein—

Figure 1 is a plan view of a machine constructed in accordance with my invention. Fig. 2 is an elevation thereof partly broken away which shows a method of mounting the saws, Fig. 3 is an elevation of the turret or coupling carrying device, and Fig. 4 is a view from the opposite end of the structure.

Referring more particularly to the drawings, it will be seen that I provide a base or support 10 on which an electric motor 11 may be mounted. Directly connected to the armature shaft of the motor is the saw shaft 12, on which one or more saws 13 may be mounted. These saws are inclosed within a guard 14. The saw shaft is carried on ball bearings 15 and both ends of the bearing are closed by the caps 16, a bath of oil being maintained within the space inclosed by the caps. The coupling which joins the armature shaft of the motor to the shaft 12 includes a pulley 17 which is connected to a pulley 18 by a belt 19. A worm 20 is rotated by the pulley 18, which worm actuates a worm gear 21 mounted on a shaft 22, which shaft likewise carries a worm, 23 actuating a worm gear 24 mounted on a shaft 25, which shaft carries the turrets 26, one of which is shown in elevation in Fig. 3. Each turret is provided with radial arms and to the ends of the arms are secured jaws or holders 27 having angular converging faces between which the couplings are accommodated.

The angular converging faces of the jaws or holders 27 enable couplings of varying sizes to be held in position on the turret while being moved into and out of engagement with the saw or saws 13. The couplings are fed into the holders at the point A on Fig. 3.

It will be understood that there is always one more turret than there are saws in order that the couplings may be held on both sides of each saw. At the point of engagement of the saw with the coupling the coupling is held rigidly against escape. However, as the rotation of the turret continues and the coupling is severed the turret reaches a position where the couplings fall out by gravity. The operation is continuous and no actuations of parts are necessary by the operator, it being merely necessary to feed couplings into the holders 27 at the point A. The holders 27 are held in place by the tongue and groove and the bolt 28 and may, therefore, be readily removed and holders of other sizes substituted in place thereof. This adapts the machine to different sizes of couplings.

The device is economical in construction and operation and reduces materially the cost of severing previously formed couplings.

I claim:

1. In apparatus of the class described the combination of a positively driven shaft having a saw thereon, a shaft below the driven shaft having a rotary turret thereon, and means connecting said shafts to revolve the turret when the driven shaft is actuated, to thereby move couplings supported on the turret into cutting engagement with the saw, said turret having a coupling holder on the periphery thereof and said coupling holder having converging coupling engaging faces whereby couplings of varying sizes are held in position on the turret.

2. In apparatus of the class described the combination of a positively driven shaft having at least one saw thereon, a shaft below the driven shaft having a rotary turret thereon, and means connecting said shaft to revolve the turret when the driven shaft is actuated, to thereby move couplings supported on the turret into cutting engagement with said saws, said turret having arms with coupling holders on the ends of the arms and said holders having converging coupling engaging faces whereby couplings of varying sizes are positioned on the turret.

3. In apparatus of the class described the combination of a motor shaft having a saw thereon, a motor for driving said shaft and saw, a turret shaft having a turret thereon below the saw, a worm wheel on the turret shaft, a worm shaft having a worm meshing with the said worm wheel, a belt connecting the worm shaft and motor shaft arranged to revolve the turret when the motor shaft is rotated, and a plurality of coupling holders on said turret, said holders having converging coupling engaging faces whereby couplings of varying sizes are held in position on the turret in moving the couplings into cutting engagement with said saw.

4. In apparatus of the class described the combination of a motor shaft having a saw thereon, a motor for driving said shaft, a turret shaft having a turret thereon, a worm wheel on the turret shaft, a worm shaft having a worm meshing with said worm wheel to rotate the turret, a belt connecting said worm shaft and motor shaft arranged to revolve the turret when the motor shaft is rotated, and a series of coupling holders removably secured on said turret, said coupling holders having converging coupling engaging faces whereby couplings of varying sizes are held in position on the turret in moving the couplings into cutting engagement with the saw.

Signed at Lorain, Ohio, this 24 day of March, 1915.

RICHARD SCHOLZ.

Witnesses:
 CHAS. FELL,
 ARTHUR R. GRABER.